United States Patent Office 3,828,083
Patented Aug. 6, 1974

3,828,083
NOVEL 6α,16α-DIMETHYL STEROIDS
Klaus Kieslich, Ulrich Kerb, Klaus Mengel, and Amadeo Domenico, Berlin, Germany, assignors to Schering Aktiengesellschaft
No Drawing. Filed Nov. 23, 1971, Ser. No. 201,546
Claims priority, application Germany, Nov. 28, 1970, P 20 59 310.6
Int. Cl. C07c 169/32
U.S. Cl. 260—397.45
12 Claims

ABSTRACT OF THE DISCLOSURE

6α,16α-Dimethyl steroids of the formula

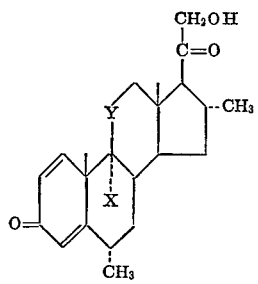

wherein X is a halogen atom and Y is β-halomethylene in which the halogen atom has the same or a lower atomic weight than X, β-hydroxymethylene or carbonyl, and 21-esters thereof possess a high ratio of anti-inflammatory activity to thymolytic side-effects.

BACKGROUND OF THE INVENTION

This invention relates to novel 6α,16α-dimethyl steroids.

SUMMARY OF THE INVENTION

The compounds of this invention are 6α,16α - dimethyl steroids of the general Formula I

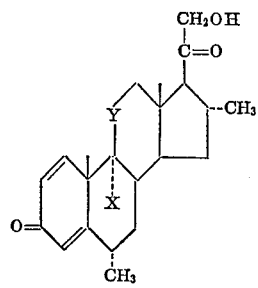

wherein X is a halogen atom; and Y is β-halomethylene in which the halogen atom has the same or lower atomic weight than X, β-hydroxymethylene or carbonyl; and 21-esters thereof.

DETAILED DISCUSSION

Of the compounds of this invention, preferably (a) X is Cl or F, preferably F; (b) Y is β-HOCH=, OC= or β-Cl—CH=; especially those defined in (a); (c) the ester is an ester of a hydrocarbon carboxylic, preferably alkanoic, acid containing up to 15, preferably 2 to 8, carbon atoms, inclusive, especially esters of compounds defined in (a) and (b).

Since the 21-ester group can be subsequently saponified, it can be any esterified OH group. Preferred are esters of physiologically acceptable acids. Preferred acids are hydrocarbon carboxylic acids, e.g., of up to 15 carbon atoms, preferably 2 to 12 carbon atoms. These acids can be aliphatic, cycloaliphatic, aromatic, or mixed aromatic-aliphatic acids. Examples of such acids are straight or branched chain alkanoic, e.g., formic acid, acetic acid, propionic acid, butyric acid, valeric acid, caproic acid, enanthic acid, undecylic acid, trimethylacetic acid diethylacetic acid, tert.-butylacetic acid; aralkanoic, e.g., phenylacetic acid; cycloalkanoic, e.g., cyclopentylpropionic acid; and aryl, e.g., benzoic acid.

As is well known in steroid chemistry, when the free 21-OH steroid possesses the desired activity, the exact nature of the acyl moiety of an ester of such an active 21-OH compound is not critical. Thus, equivalents of the esters described above are esters corresponding to acids bearing one or more simple substituents which do not affect the fundamental character of the steroid. Thus, an acid described above can be substituted with halogen, e.g., mono-, di- or tri-chloro-acetic acid, or any other substituted acid which has been employed to form an ester of a 21-hydroxy steroid, and esters of amino acids, e.g., aminoacetic acid, diethylamino-, piperidino- and morpholino-acetic acid, can be used to form water soluble half-esters. Also suitable are esters of the usual inorganic acids, such as, for example, sulfuric acid and phosphoric acid which also can be used to produce water soluble esters.

For the preparation of water-soluble products, the aminoacylates, e.g., diethylamino-, piperidino-, and morpholino-acetates, can be converted into their acid addition salts, e.g., hydrochloride, and the sulfuric acid esters and phosphoric acid esters and the esters of dibasic organic acids can be converted into their alkali metal, e.g., sodium, salts.

This invention also relates to a process for the preparation of the novel 6α,16α-dimethyl steroids of the general Formula I, in which halogen, hypochlorous acid or hypobromous acid is chemically added in a conventional manner to the $\Delta^{9(11)}$-double bond of a 6α,16α-dimethyl steroid of the general Formula II

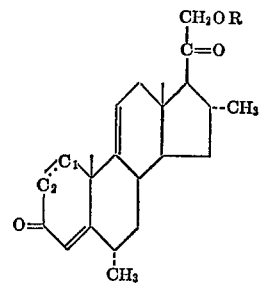

wherein R is a hydrogen atom or the acyl radical of an organic or inorganic acid; and $$C_2\text{------}C_1$$

is a single or double bond. The thus-formed 9α-chloro- or 9α-bromo-11β-hydroxy steroid of Formula I optionally is thereafter converted into the corresponding 9,11β-epoxide and the epoxide ring is thereafter opened with hydrogen fluoride or hydrogen chloride to form the corresponding 9α-fluoro- or 9α-chloro-11β-hydroxy steroid. When

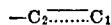

represents a single bond, the 9α-halogenated product of the halogenation reaction is dehydrogenated by fermentation with a microorganism customarily employed for the Δ$^1$-dehydrogenation. If desired, an 11β-hydroxy group is oxidized to a keto group. An esterified 21-hydroxy group can also be saponified to produce the free 21-hydroxy steroid and then optionally, re-esterified to another 21-ester as defined herein.

A large number of means exist for adding halogen to the Δ$^{9(11)}$-double bond of the compounds of Formula II. Thus, a halogen can be added directly to the double bond, for example, using a halogen, preferably chlorine or bromine, or a mixed halogen compound, such as, for example, chlorine monofluoride or bromine monochloride, or halogen derived from a polyhalide, such as, e.g., potassium triiodide or iodine dichlorobenzene.

The halogen addition to the 9(11)-double bond is effected particularly satisfactorily by treating the Δ$^{9(11)}$-steroids simultaneously with positive and negative halogen. Reagents yielding positively polarized halogen are, for example, haloacylimides, e.g., a halosuccinimide, haloacylamides, e.g., a haloacetamide, or the halogens themselves. Suitable reagents yielding negatively polarized halogen are, e.g., hydrohalides and alkali metal halides, especially lithium halides, e.g., lithium chloride and lithium bromide.

The addition of halogen to the Δ$^{9(11)}$-double bond of the steroid is always effected in such a manner that the positively charged halogen is added to the 9-position and the negatively charged halogen is added to the 11-position of the molecule. The atomic weight of the halogen in the 9-position is never lower than that of the halogen in the 11-position, due to the known differing electronegativities of the halogens. The halogen addition to the Δ$^{9(11)}$-double bond is preferably conducted at temperatures of between −75° C. and +50° C.

The addition of hypochlorous or hypobromous acid to the Δ$^{9(11)}$-double bond of the compounds is conducted according to techniques known for this reaction. A preferred method is the treatment of the Δ$^{9(11)}$-double bond with reactants liberating during the course of the reaction in the presence of water and in an acidic reaction medium, hypochlorous or hypobromous acid, i.e., especially with reactants which form halogen cations, such as, for example, dibromomethylhydantoin, N-haloacylamides, particularly N-chloro- or N-bromoacetamide, or N-haloacylimides, especially N-bromo- or N-chlorosuccinimide.

If the desired final product of the process is a 9α-fluoro compound, the 9α-bromo- (or -chloro-) 11β-hydroxy group is closed, after the hypohalogenite addition to the 9,11-double bond has been accomplished, to the 9-11-oxide ring, likewise in a conventional manner, for example, by treatment with a basic reactant, such as, for example, sodium hydroxide, potassium hydroxide, potassium carbonate, potassium acetate, pyridine and similar compounds, preferably at an elevated reaction temperature. The thus-produced oxido ring is subsequently converted into a 9α-fluoro-11β-hydroxy group with hydrofluoric acid. In the same manner, 9α-bromo-11β-hydroxy steroids of Formula I can be converted into the corresponding 9α-chloro-11β-hydroxy steroids by opening the epoxide ring with hydrogen chloride instead of hydrogen fluoride.

If the

group in the starting material is a single bond, it is necessary to dehydrogenate this single bond, e.g., by fermentation with a microorganism customarily employed for the Δ$^1$-dehydrogenation. Suitable microorganisms for conducting this process step are preferably *Bacillus lentus*, particularly *Bacillus lentus* (ATCC 13805) or *Arthrobacter simplex*, particularly *Arthrobacter simplex* (ATCC 6946). The microbiological dehydrogenation is conducted according to known methods by submerged aerobic fermentation. The conversion of the substrate, added as a solution or suspension, can be followed by the analysis of sample extracts by thin-layer chromatography. After the fermentation is terminated, the steroidal fermentation product is extracted from the culture broth with a suitable, water-immiscible solvent and purified, for example by evaporation and additional conventional working-up methods, such as recrystallization and/or chromatography on silica gel.

To produce the 11-keto compounds of Formula I, the corresponding 11β-hydroxy steroids are oxidized in a manner known per se, for example with chromic acid. In order to saponify the 21-acyloxy compounds, the conventional modes of operation can be employed, for example the saponification by means of alkali alcoholates in alcohol, or by means of an aqueous alkali hydroxide or alkali carbonate solution.

The esterification of the free 21-hydroxy group can be conducted in accordance with the known methods, for example by treating a 21-hydroxy steroid with an acid anhydride or acid halogenide in the presence of a basic catalyst, e.g., pyridine, lutidine or an aqueous sodium bicarbonate solution, etc.

The starting compounds of the general Formula II can be prepared by splitting off water from the known 11α- or 11β - hydroxy-21-acyloxy-6α,16α-dimethyl - 4 - pregnadiene-3,20-diones, or the Δ$^1$-compounds thereof (German Pat. No. 1,240,860 and German Unexamined Published Application OS 1,909,152). One method of splitting off water is by treating an 11-hydroxy-21-acyloxy steroid in a conventional manner with an acid chloride, e.g., methanesulfonic acid chloride, in the presence of an organic base and dimethylformamide, with heating.

The 6α,16α-dimethyl steroids of general Formula I produced according to the process of this invention are distinguished by a very good antiphlogistic effectiveness. They have the additional advantage of very minor thymolytic side-effects compared to the conventional anti-inflammatory steroids. The antiphlogistic effectiveness of the compounds of Formula I was determined by the use of the conventional paw edema test. For these experiments, SPF rats (specific-pathogen free rats) of 130–150 g. weight were utilized. These rats were injected in the right hind paw with 0.1 ml. of a 0.5%, *Mycobacterium butyricum* suspension (Difco, U.S.) to generate the center of inflammation. Prior to the injection, the paw volume of the rats was measured. Twenty-four hours after the injection, the paw volume was measured once again to determine the extent of the edema. Thereafter, varying amounts of the antiphlogistic substances were administered to the rats, subcutaneously or orally. After another 24 hours, the paw volume was again determined. From the thus-obtained results, the regression curves were determined. From these curves, the dosage (mg. per kg. of body weight) was then obtained at which a 50% reduction of the edema was achieved (ED$_{50}$ value).

In order to determine the thymolytic effect, ether anesthetized. SPF rats weighing 70–90 g. were adrenalectomized. Groups of six animals were treated over a period of three days daily with varying amounts of the test substance, subcutaneously or perorally. On the fourth day, the animals were sacrificed and the thymus weights were determined. From the thymus weights, the regression curves were obtained and from the latter, in turn, the dosage (mg. per kg. of body weight) at which a reduction of the weight of the thymus by 50% was observed (ED$_{50}$ value).

As shown by the data in the following table, pharmalogical effectiveness of the substances prepared according to this invention is superior to the commercially available antiphlogistic 6α-fluoro-11β,21-dihydroxy-16α-methyl-1,4-pregnadiene-3,20-dione.

| Compound | Edema test, $ED_{50}$ | | Thymolysis test, $ED_{50}$ | |
|---|---|---|---|---|
| | S.c. | P.o. | S.c. | P.o. |
| I. 6α-fluoro-11β,21-dihydroxy-16α-methyl-1,4-pregnadiene-3,20-dione | 1.64 | 5.02 | 0.28 | 0.50 |
| II. 9α-fluoro-11β,21-dihydroxy-6α,16α-dimethyl-1,4-pregnadiene-3,20-dione | 0.11 | 0.087 | 0.04 | 0.055 |
| III. 9α-chloro-11β,21-dihydroxy-6α,16α-dimethyl-1,4-pregnadiene-3,20-dione | 0.22 | 1.10 | 0.10 | 0.10 |

Because the novel compounds are distinguished by high antiphlogistic effectiveness and a very high ratio of desired anti-inflammatory effect to undesired thymolytic side-effect, they are useful, in combination with the vehicles customary in galenic pharmacy, for the treatment of, for example:

(a) Topical administration: contact dermatitis, eczemas of a great variety of types, neurodermitis, erythrodermia, first-degree burns, pruritus vulvae et ani, rosacea, erythematodes cutaneus, psoriasis, lichen ruber planus et verrucosus;

(b) Oral administration: acute and chronic polyarthritis, neurodermitis, bronchial asthma, hay fever, etc.

The specific drugs are prepared in the usual manner by converting the effective agents, together with pharmaceutically acceptable additives, carriers and flavoring agents, into the desired forms of application, such as tablets, dragées, capsules, solutions, ointments, etc. The concentration of effective agent in the thus-formulated drugs is dependent on the form of administration.

The compounds can be employed in the treatment of inflammatory conditions formulated in conventional pharmaceutically acceptable carriers in the forms customarily employed in pharmaceuticals. For oral administration, especially suitable are tablets, dragées, capsules, pills, suspensions and solutions. Suitable excipients for tablets are, for example, lactose, amylose, talc, gelatin, magnesium stearate, and the like.

For topical administration, suitable are powders, solutions, suspensions, aerosols, and vaginal suppositories. For parenteral application, aqueous and oily solutions or suspensions can be employed.

The compounds of this invention are formulated so as to provide, for example 0.1 to 50 mg. of the effective agent in admixture with 50 mg. to 5.0 g. of a pharmacologically indifferent excipient, i.e., a pharmaceutically acceptable carrier, per unit dosage, e.g., per tablet.

The novel effective agents are usually administered topically at concentrations in the pharmaceutical carrier of between 0.001 and 2%, preferably 0.01 to 0.5%.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

(a) 6.5 g. of 11α,21-dihydroxy-6α,16α-dimethyl-1,4-pregnadiene-3,20-dione is dissolved in 65 ml. of dimethylformamide, mixed with 13 ml. of acetic anhydride and 650 mg. of lead(II) acetate, and agitated for two hours at room temperature.

The reaction mixture is then added dropwise under stirring to 300 ml. of 10% strength sodium acetate solution, thereafter agitated for one hour, the thus-precipitated product is vacuum-filtered, washed with water, and dried at 60° C. under vacuum, thus obtaining 6.5 g. of 11α - hydroxy - 21 - acetoxy - 6α,16α - dimethyl - 1,4- pregnadiene-3,20-dione as a crude product with a melting point of 160–164° C. After recrystallization from diisopropyl ether, 5.1 g. of pure product is obtained therefrom, m.p. 170–171° C.

(b) 5.3 g. of 11α-hydroxy-21-acetoxy-6α,16α-dimethyl-1,4-pregnadiene-3,20-dione is dissolved in 25 ml. of dry pyridine and mixed dropwise, under stirring and cooling to about 0° C., with 3 ml. of methanesulfonic acid chloride. Then, the reaction mixture is agitated for 30 minutes at 0° C. and another 90 minutes at +10° C. to +20° C. and thereafter added dropwise to a mixture of 600 ml. of ice water and 30 ml. of concentrated hydrochloric acid. The mixture is stirred for one hour, and the thus-separated product is vacuum-filtered and dried under vacuum at 40° C., thus obtaining 6.3 g. of 11α-mesyloxy-21-acetoxy-6α,16α-dimethyl-1,4-pregnadiene-3,20-dione as a crude product, m.p. 174–175° C.

(c) 6.3 g. of 11α-mesyloxy-21-acetoxy-6α,16α-dimethyl-1,4-pregnadiene-3,20-dione is dissolved in 120 ml. of glacial acetic acid, mixed with 11.5 g. of anhydrous sodium acetate, and heated in a nitrogen atmosphere under agitation for six hours to the boiling point. Then, about 50 ml. of glacial acetic acid is distilled off under vacuum at a bath temperature of about 60° C., the residue added dropwise to approximately 600 ml. of ice water, and the mixture stirred for one hour. The thus-precipitated product is vacuum-filtered, washed neutral with water, and dried under vacuum at 40° C., thus obtaining 4.9 g. of 21-acetoxy-6α,16α - dimethyl - 1,4,9(11) - pregnatriene-3,20-dione as a crude product, m.p. 158–163° C.

(d) 6.2 g. of 21-acetoxy-6α,16α - dimethyl - 1,4,9(11)-pregnatriene-3,20-dione is dissolved in 120 ml. of pure tetrahydrofuran and mixed in a nitrogen atmosphere at about 20° C. dropwise with 50 ml. of 1N perchloric acid. Subsequently, 9.1 g. of N-bromosuccinimide is added batchwise, the mixture is stirred for 30 minutes at 20° C., and then mixed in incremental portions with a solution of 8.6 g. of sodium sulfite in 1.1 l. of ice water. The mixture is stirred for another hour, the thus-separated product is vacuum-filtered, mixed with water, and dissolved in 120 ml. of chloroform. The chloroform phase is washed twice with water, dried over sodium sulfate, and stirred with active carbon for 30 minutes at room temperature. Then, the carbon is filtered off and the chloroform phase is concentrated under vacuum at 30° C. The residue is recrystallized from chloroform-diisopropyl ether, thus obtaining 5.8 g. of 9α-bromo-11β-hydroxy-21-acetoxy-6α,16α-dimethyl-1,4-pregnadiene - 3,20 - dione, having a decomposition point of 163–164° C.

EXAMPLE 2

(a) 5.8 g. of 9α-bromo-11β-hydroxy-21-acetoxy - 6α,16α-dimethyl-1,4-pregnadiene-3,20 - dione is mixed with 10.6 g. of anhydrous potassium acetate and 50 ml. of ethanol and heated to the boiling point in a nitrogen atmosphere under agitation for 90 minutes. After the reaction is terminated, the mixture is cooled to room temperature, poured into 600 ml. of ice water, and agitated for one hour. The thus-separated product is vacuum-filtered, washed with water, and then dried at 40° C. under vacuum, thus producing 4.4 g. of 21-acetoxy-9,11β-epoxy-6α,16α-dimethyl-1,4-pregnadiene - 3,20 - dione as a crude product having a melting point of 170–173° C.

(b) 4.4 g. of 21-acetoxy-9,11β-epoxy-6α,16α-dimethyl-1,4-pregnadiene-3,20-dione is introduced batchwise under agitation into a mixture of 15 ml. of liquid hydrogen fluoride and 15 ml. of dimethylformamide, cooled to −20° C. Thereafter, the reaction mixture is stirred for 48 hours at 0° C. and then added dropwise under stirring to a mixture of 600 ml. of ice water and 60 ml. of concentrated ammonia. The mixture is agitated for one hour, the thus-separated product is vacuum-filtered, washed neutral with water, and dried at 40° C. under vacuum. The crude product obtained in this way is recrystallized from methylene chloride-diisopropyl ether, thus producing 4.5 g. of 9α-fluoro-11β - hydroxy - 21 - acetoxy - 6α,16α-dimethyl-1,4-pregnadiene-3,20-dione, m.p. 213–216° C.

EXAMPLE 3

2.2 g. of 9α-fluoro-11β-hydroxy-21 - acetoxy - 6α,16α-dimethyl-1,4-pregnadiene-3,20-dione is dissolved in 120 ml. of anhydrous methanol, mixed under agitation with 610 mg. of sodium methylate, and stirred under a nitrogen atmosphere for 10 minutes at room temperature. Then, the mixture is mixed with 0.6 ml. of water, agitated for another five minutes, neutralized with glacial acetic acid, and concentrated under vacuum at 40° C. The residue is dissolved in ethyl acetate, and the ethyl acetate phase is washed twice with water, dried over sodium sulfate, and concentrated under vacuum at 40° C. The thus-obtained crude product is recrystallized from acetone-diisopropyl ether, thus producing 1.6 g. of 9α-fluoro-11β, 21-dihydroxy-6α,16α-dimethyl-1,4 - pregnadiene - 3,20-dione, m.p. 214–216° C.

EXAMPLE 4

0.5 g. of 9α-fluoro-11β,21-dihydroxy-6α,16α-dimethyl-1,4-pregnadiene-3,20-dione is mixed with 2 ml. of pyridine and 0.5 ml. of caproic anhydride and agitated for 3 hours at room temperature. Then, the reaction mixture is poured into 50 ml. of water, extracted with methylene chloride, the methylene chloride phase washed with water, dried over sodium sulfate, and concentrated to dryness under vacuum. The residue is chromatographed over a silica gel column withe an acetone-hexane gradient, thus obtaining 420 mg. of 9α-fluoro-11β-hydroxy-21-hexanoyloxy-6α,16α-dimethyl-1,4 - pregnadiene - 3,20 - dione as a syrup.

EXAMPLE 5

0.3 g. of 9α-fluoro-11β,21-dihydroxy-6α,16α-dimethyl-1,4-pregnadiene-3,20-dione is mixed with 2 ml. of pyridine and 0.5 ml. of benzoyl chloride and agitated for 3 hours at room temperature. After the reaction mixture has been worked up as described in Example 4, 0.23 g. of 9α-fluoro-11β-hydroxy-21-benzoyloxy - 6α,16α - dimethyl-1,4-pregnadiene-3,20-dione is obtained in the form of a syrup.

EXAMPLE 6

2.2 g. of 21-acetoxy-6α,16α-dimethyl-1,4,9(11)-pregnatriene-3,20-dione is mixed with 60 ml. of tetrahydrofuran, 4.5 g. of N-chlorosuccinimide, and 25 ml. of 1N perchloric acid and stirred for 3.5 hours at 30° C. Thereafter, the reaction mixture is poured into ice water, the thus-precipitated product is vacuum-filtered and dissolved in methylene chloride. The methylene chloride phase is washed neutral and concentrated to dryness under vacuum. The residue is recrystallized from acetone-hexane and yields 9α-chloro-11β-hydroxy - 21 - acetoxy - 6α,16α-dimethyl-1,4-pregnadiene-3,20-dione, decomposition point 219–221° C.

EXAMPLE 7

1.9 g. of 9α-chloro-11β-hydroxy-21-acetoxy-6α,16α-dimethyl-1,4-pregnadiene-3,20-dione is suspended in 20 ml. of methylene chloride and 20 ml. of methanol, the mixture is cooled to about 0° C., mixed with a solution of 120 mg. of potassium hydroxide in 4 ml. of methanol, and agitated for 10 minutes. Then, the mixture is neutralized with acetic acid, diluted with chloroform; the chloroform phase washed with water; and the chloroform phase is evaporated to dryness under vacuum. The residue is recrystallized from acetone-hexane, thus obtaining 9α-chloro-11β,21-dihydroxy-6α,16α-dimethyl - 1,4 - pregnadiene-3,20-dione, decomposition point 232–234° C.

EXAMPLE 8

800 mg. of 9α-chloro-11β,21-dihydroxy-6α,16α-dimethyl-1,4-pregnadiene-3,20-dione is dissolved in 8 ml. of pyridine, the mixture is cooled to —10° C., mixed dropwise with 0.96 ml. of isobutyric acid chloride, and stored for 60 hours at about 0° C. Thereafter, the reaction mixture is poured into ice water, the thus-precipitated product is vacuum-filtered, washed with water, and dried under vacuum at 40° C. The crude product is recrystallized from acetone-hexane, thus obtaining 9α-chloro-11β-hydroxy - 21 - isobutyryloxy-6α,16α-dimethyl - 1,4 - pregnadiene-3,20-dione, m.p. 207–208° C.

EXAMPLE 9

0.5 g. of 21-acetoxy-6α,16α-dimethyl-1,4,9(11)-pregnatriene-3,20-dione is dissolved in 20 ml. of glacial acetic acid, mixed with 2 g. of lithium chloride, and cooled to about 0° C. Then, a solution of 198 mg. of N-chlorosuccinimide and 52 mg. of hydrogen chloride in 0.5 ml. of tetrahydrofuran is added to this mixture, and the latter stirred for 4.5 hours at room temperature. Then, the product is precipitated with ice water, vacuum-filtered, and dissolved in methylene chloride. The methylene chloride phase is washed neutral with water, concentrated under vacuum, and the residue recrystallized from ether-pentane, thus obtaining 9α,11β-dichloro-21-acetoxy-6α, 16α - dimethyl - 1,4 - pregnadiene-3,20-dione, m.p. 180–181° C.

EXAMPLE 10

300 mg. of 9α,11β-dichloro-21-acetoxy-6α,16α-dimethyl-1,4-pregnadiene-3,20-dione is saponified as described in Example 7, thus producing 9α,11β-dichloro-21-hydroxy-6α,16α - dimethyl-1,4-pregnadiene-3,20-dione, decomposition point 205° C.

EXAMPLE 11

(a) A mixture of 5.6 g. of 11β-hydroxy-21-acetoxy-6α,16α-dimethyl-4-pregnene-3,20-dione, 28 ml. of dimethylformamide, 5.5 ml. of pyridine, and 2.6 ml. of methanesulfonic acid chloride is agitated under a nitrogen atmosphere on a steam bath for 80 minutes. After termination of the reaction, the mixture is poured into water; the precipitated product is vacuum-filtered and chromatographed over a silica gel column by means of an acetone-hexane gradient.

In this manner, 3.1 g. of 21-acetoxy-6α,16α-dimethyl-4,9(11)-pregnadiene-3,20-dione is obtained, which is dissolved in 60 ml. of tetrahydrofuran. At room temperature, 25 ml. of 1N perchloric acid is added dropwise to this solution, and then 4.55 g. of N-bromosuccinimide is added thereto. The mixture is stirred for 30 minutes, thereafter poured into a solution of 4.3 g. of sodium sulfite and 500 ml. of ice water and agitated another hour. The thus-separated product is vacuum-filtered and dried at 30° C. under vacuum.

3.0 g. of 9α-bromo-11β-hydroxy-21-acetoxy-6α,16α-dimethyl-4-pregnene-3,20-dione is thus produced; this product is suspended in 25 ml. of ethanol and mixed with 5 g. of anhydrous potassium acetate. Thereafter, the reaction mixture is heated in a nitrogen atmosphere to the boiling point for 1.5 hours under agitation, allowed to cool, and then poured into 300 ml. of ice water. The mixture is stirred for one hour, and the thus-precipitated substance is vacuum-filtered, washed with water, and dried at 40° C. under vacuum.

The thus obtained 21-acetoxy-9,11β-epoxy-6α,16α-dimethyl-4-pregnene-3,20-dione (2.2 g.) is introduced batchwise into a mixture of 7.5 ml. of liquid hydrogen fluoride and 15 ml. of dimethylformamide, cooled to —20° C. The mixture is stirred at 0° C. for two days and then introduced into a solution of 30 ml. of concentrated ammonia in ice water. The thus-separated product is vacuum-filtered, washed with water, recrystallized as the crude product from methylene chloride-diisopropyl ether, and the result is 2.1 g. of 9α-fluoro-11β-hydroxy-21-acetoxy-6α,16α-dimethyl-4-pregnene-3,20-dione, m.p. 198–200° C.

(b) An Erlenmeyer flask, capacity 2 liters—filled with 500 ml. of sterile, aqueous medium, containing 1.5% of peptone, 1.2% of cornsteep liquor, 0.2% of $MgSO_4$— is inoculated with a lyophilic culture of Bacillus lentus (ATCC 13805) and shaken for 48 hours at 30° C. at 145 r.p.m.

A 20 ml. glass fermentor—charged with 14.75 l. of sterilized nutrient solution consisting of 0.1% of yeast extract, 0.5% of cornsteep liquor, and 0.005% of glucose—is inoculated with 250 ml. of this suspension of bacteria and germinated for 24 hours at 29° C. with an aeration of 15 l. of air per minute and an agitation speed of 220 r.p.m.

From this preliminary fermentation, 0.5 l. is transferred into a glass fermentor having a capacity of 20 l. and charged with 8 l. of a sterilized medium having the same composition. For the main fermentation, the same technical conditions are utilized as in the preliminary fermentation. After a growth phase of 6 hours, 2 g. of 9-fluoro-11β-hydroxy - 21-acetoxy - 6α,16α - dimethyl-4-pregnene-3,20-dione in 40 ml. of dimethylformamide is added thereto, and fermented. After about 24 hours, the culture broth is extracted first with 4 l. of methyl isobutyl ketone and thereafter twice more with the same substance in an amount of respectively 3 l. The combined extracts are concentrated in a circulating evaporator under vacuum at 30–35° C. and evaporated to dryness in a rotary evaporator at a bath temperature of maximally 40° C. under vacuum. The residue is washed free of antifoam agent hexane with a small amount of cold hexane, and recrystallized from ethyl acetate.

In this way, 9α-fluoro-11β,21-dihydroxy-6α,16α-dimethyl-1,4-pregnadiene - 3,20 - dione is obtained, m.p. 213–215° C.

EXAMPLE 12

200 mg. of 9α-fluoro-11β-hydroxy-21-acetoxy-6α,16α-dimethyl-1,4-pregnadiene-3,20-dione is dissolved in 12 ml. of 96% acetone, mixed with 137 mg. of N-bromoacetamide, and allowed to stand for 3.5 hours at room temperature. Then, the reaction mixture is poured into 60 ml. of water and extracted with methylene chloride. The methylene chloride phase is washed neutral with water, dried over sodium sulfate, and concentrated under vacuum. The thus-obtained crude product is recrystallized several times from ethyl acetate-diisopropyl ether, and in this manner 9α-fluoro-21-acetoxy - 6α,16α - dimethyl-1,4-pregnadiene-3,11,20-trione is produced, m.p. 202–204° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A 6α,16α-dimethyl steroid of the formula

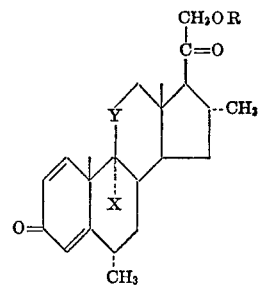

wherein R is a hydrogen atom or the acyl radical of a hydrocarbon carboxylic acid containing up to 15 carbon atoms, inclusive; X is chlorine or bromine; and Y is β-halomethylene in which the halogen atom has the same or a lower atomic weight than X, β-hydroxymethylene or carbonyl.

2. A compound of Claim 1 wherein X is Cl.
3. A compound of Claim 1 wherein Y is β-HOCH=.
4. A compound of Claim 3 wherein X is Cl.
5. A compound of Claim 1 9α-bromo-11β-hydroxy-21-acetoxy-6α,16α-dimethyl-1,4-pregnadiene-3,20-dione.
6. A compound of Claim 1 9α,fluoro-21-acetoxy-6α,16α,-dimethyl-1,4-pregnadiene-3,11,20-trione.
7. A compound of Claim 1 9α-chloro-11β-hydroxy-21-acetoxy-6α,16α-dimethyl-1,4-pregnadiene-3,20-dione.
8. A compound of Claim 1 9α - chloro-11β,21 - dihydroxy-6α,16α-dimethyl-1,4-pregnadiene-3,20-dione.
9. A compound of Claim 1 9α-chloro-11β-hydroxy-21-isobutyryloxy - 6α,16α - dimethyl - 1,4-pregnadiene-3,20-dione.
10. A compound of Claim 1 9α,11β-dichloro-21-acetoxy-6α,16α-dimethyl-1,4-pregnadiene-3,20-dione.
11. A compound of Claim 1 9α,11β-dichloro-21-hydroxy-6α,16α-dimethyl-1,4-pregnadiene-3,20-dione.
12. 9α - Fluoro - 21-acyloxy-6α,16α-dimethyl-1,4-pregnadiene-3,11,20-dione wherein acyl is the acyl radical of a hydrocarbon carboxylic acid containing up to 15 carbon atoms.

References Cited
UNITED STATES PATENTS 3,501,513   3/1970   Bacso _____ 260—397.45
3,657,434   4/1972   Radscheit et al. ___ 260—397.45
3,678,034   7/1972   Laurent et al. ___ 260—239.55 R ELBERT L. ROBERTS, Primary Examiner U.S. Cl. X.R.

424—242, 243; 260—239.55; 195—51

UNITED STATES PATENT OFFICE
CERTIFICATE OF CORRECTION

Patent No. 3,828,083   Dated August 6, 1974

Inventor(s) Klaus Kieslich et al

It is certified that error appears in the above-identified patent and that said Letters Patent are hereby corrected as shown below:

Claim 6, line 1: change the dependency to --Claim 12--.

Signed and sealed this 12th day of November 1974.

(SEAL)
Attest:

McCOY M. GIBSON JR.　　　　　　　　C. MARSHALL DANN
Attesting Officer　　　　　　　　　Commissioner of Patents